United States Patent
Arimilli et al.

(10) Patent No.: US 6,321,305 B1
(45) Date of Patent: Nov. 20, 2001

(54) MULTIPROCESSOR SYSTEM BUS WITH COMBINED SNOOP RESPONSES EXPLICITLY CANCELLING MASTER ALLOCATION OF READ DATA

(75) Inventors: Ravi Kumar Arimilli, Austin; John Steven Dodson, Pflugerville; Guy Lynn Guthrie; Jody B. Joyner, both of Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,230

(22) Filed: Aug. 4, 1999

(51) Int. Cl.⁷ ..................................................... G06F 12/00
(52) U.S. Cl. .......................... 711/143; 711/122; 711/138; 711/146
(58) Field of Search .................................... 711/122, 143, 711/138, 146

(56) References Cited

U.S. PATENT DOCUMENTS

| | | |
|---|---|---|
| 4,797,814 | 1/1989 | Brenza . |
| 5,369,753 | 11/1994 | Tipley . |
| 5,493,668 | 2/1996 | Elko et al. . |
| 5,564,035 | 10/1996 | Lai . |
| 5,636,355 | 6/1997 | Ramakrishnan et al. . |
| 5,829,040 | 10/1998 | Son . |
| 5,895,495 | 4/1999 | Arimilli et al. . |
| 5,946,709 | 8/1999 | Arimilli et al. . |
| 5,966,729 | 10/1999 | Phelps . |
| 6,018,791 | 1/2000 | Arimilli et al. . |
| 6,021,468 | 2/2000 | Arimilli et al. . |
| 6,023,747 | 2/2000 | Dodson . |
| 6,029,204 | 2/2000 | Arimilli et al. . |
| 6,058,456 | 5/2000 | Arimilli et al. . |
| 6,195,729 | 2/2001 | Arimilli et al. . |

OTHER PUBLICATIONS

Texas Instruments Incorporated, TMS32010 User's Guide, 1983, 3 pages.
Lebeck, A. R., Sohi, G. S.; Request Combining in Multiprocessors with Arbitrary Interconnection Networks, IEEE Digital Library, vol. 5, Issue 11, Nov. 1994—Abstract Only.
Handy, Jim; *The Cache Memory Book;* Academic Press, Inc.; 1993; pgs. 77–82.

Primary Examiner—D. Robertson
(74) Attorney, Agent, or Firm—Casimer K. Salys; Bracewell & Patterson, L.L.P.

(57) ABSTRACT

In cancelling the cast out portion of a combined operation including a data access related to the cast out, the combined response logic explicitly directs the storage device initiating the combined operation not to allocate storage for the target of the data access. Instead, the target of the data access may be passed directly to an in-line processor core without storage, may be stored in a horizontal storage device, or may be stored in an in-line, noninclusive, lower level storage device. Cancellation of the cast out thus defers any latency associated with writing the cast out victim to system memory while maximizing utilization of available storage with acceptable tradeoffs in data access latency.

24 Claims, 7 Drawing Sheets

MULTIPROCESSOR SYSTEM BUS WITH COMBINED SNOOP RESPONSES EXPLICITLY CANCELLING MASTER ALLOCATION OF READ DATA

RELATED APPLICATIONS

The present invention is related to the subject matter of commonly assigned, copending U.S. patent applications: Ser. No. 09/368,222 (notice of Allowability mailed) entitled "MULTIPROCESSOR SYSTEM BUS WITH READ/CASTOUT (RCO) ADDRESS TRANSACTION"; Ser. No. 09/368,221 entitled "SYSTEM BUS DIRECTORY SNOOPING MECHANISM FOR READ/CASTOUT (RCO) ADDRESS TRANSACTION"; Ser. No. 09/368,225 entitled "PRECISE INCLUSIVITY MECHANISM FOR SYSTEM BUS WITH READ/DEALLOCATE (RDA) ADDRESS TRANSACTION"; Ser. No. 09/368,224 entitled "MULTIPROCESSOR SYSTEM BUS WITH CACHE STATE AND LRU SNOOP RESPONSES FOR READ/CASTOUT (RCO) ADDRESS TRANSACTION"; Ser. No. 09/368,223 entitled "UPGRADING OF SNOOPER CACHE STATE MECHANISM FOR SYSTEM BUS WITH READ/CASTOUT (RCO) ADDRESS TRANSACTIONS"; Ser. No. 09/368,227 (Notice of Allowability mailed—issue fee paid) entitled "MULTIPROCESSOR SYSTEM BUS WITH COMBINED SNOOP RESPONSES IMPLICITLY UPDATING SNOOPER LRU POSITION"; Ser. No. 09/368,226 (notice of Allowability mailed—issue fee paid) entitled "MULTIPROCESSOR SYSTEM BUS WITH SYSTEM CONTROLLER EXPLICITLY UPDATING SNOOPER CACHE STATE INFORMATION"; Ser. No. 09/368,229 entitled "MULTIPROCESSOR SYSTEM BUS WITH SYSTEM CONTROLLER EXPLICITLY UPDATING SNOOPER LRU INFORMATION"; Ser. No. 09/368,228 entitled "MULTIPROCESSOR SYSTEM BUS WITH COMBINED SNOOP RESPONSES EXPLICITLY CANCELLING MASTER VICTIM SYSTEM BUS TRANSACTION"; and Ser. No. 09/368,231 entitled "MULTIPROCESSOR SYSTEM BUS WITH COMBINED SNOOP RESPONSES EXPLICITLY INFORMING SNOOPERS TO SCARF". The content of the above-identified applications is incorporated herein by reference.

BACKGROUND OF THE INVENTION

1. Technical Field

The present invention relates in general to alternatives to cancelled cast out operations in data processing systems and in particular to directing nonallocation of target data for a related data access. Still more particularly, the present invention relates to instructing, within a combined response to an operation involving a cast out, a storage device initiating the cast out not to allocate and store the target data.

2. Description of the Related Art

High performance data processing systems typically include a number of levels of caching between the processor (s) and system memory to improve performance, reducing latency in data access operations. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Smaller amounts of data are maintained in upper cache levels, but may be accessed faster.

Within such systems, data access operations frequently give rise to a need to make space for the subject data. For example, when retrieving data from lower storage levels such as system memory or lower level caches, a cache may need to overwrite other data already within the cache because no further unused space is available for the retrieved data. A replacement policy—typically a least-recently-used (LRU) replacement policy—is employed to decide which cache location(s) should be utilized to store the new data.

Often the cache location (commonly referred to as a "victim") to be overwritten contains only data which is invalid or otherwise unusable from the perspective of a memory coherency model being employed, or for which valid copies are concurrently stored in other devices within the system storage hierarchy. In such cases, the new data may be simply written to the cache location without regard to preserving the existing data at that location by deallocating the cache location and reallocating the same cache location for the new data.

At other times, however, the cache location selected to received the new data contains modified data, or data which is otherwise unique or special within the storage hierarchy. In such instances, the replacement of data within a selected cache location (a process often referred to as "updating" the cache) requires that any modified data associated with the cache location selected by the replacement policy be written back to lower levels of the storage hierarchy for preservation. The process of writing modified data from a victim to system memory or a lower cache level is generally called a cast out or eviction.

When a cache initiates a data access operation—for instance, in response to a cache miss for a READ operation originating with a processor—typically the cache will initiate a data access operation (READ or WRITE) on a bus coupling the cache to lower storage levels. If the replacement policy requires that a modified cache line be overwritten, compelling a cast out for coherency purposes, the cache will also initiate the cast out bus operation.

There are a number of circumstances in which an eviction or cast out may, from the perspective of global data storage management, be less preferable than other alternatives. For example, if the target of the data access is only going to be accessed once by the processor core requesting that cache line (e.g., the cache line contains instructions not affected by branching), there would be no benefit to casting out the existing cache line in order to make space for the requested cache line. Alternatively, where a cache from which the victim is being evicted is one or multiple caches in a given level of a storage hierarchy, each supporting modified or shared intervention, and a horizontal cache (one at the same level as the evicting cache) has an invalid or shared entry within the congruence class for the victim, available data storage may be more effectively employed by allowing the data access target or the cast out victim to replace the invalid or shared entry.

It would be desirable, therefore, to be able to cancel a cast out operation or portion of an operation in order to improve global data storage management. It would further be advantageous if cancelling the eviction did not significantly increase latency of data access operations.

SUMMARY OF THE INVENTION

It is therefore one object of the present invention to provide alternatives to cancelled cast out operations in data processing systems.

It is another object of the present invention to provide a mechanism for directing nonallocation of target data for a related data access.

It is yet another object of the present invention to provide a mechanism for instructing, within a combined response to an operation involving a cast out, a storage device initiating the cast out not to allocate and store the target data.

The foregoing objects are achieved as is now described. In cancelling the cast out portion of a combined operation including a data access related to the cast out, the combined response logic explicitly directs the storage device initiating the combined operation not to allocate storage for the target of the data access. Instead, the target of the data access may be passed directly to an in-line processor core without storage, may be stored in a horizontal storage device, or may be stored in an in-line, noninclusive, lower level storage device. Cancellation of the cast out thus defers any latency associated with writing the cast out victim to system memory while maximizing utilization of available storage with acceptable tradeoffs in data access latency.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
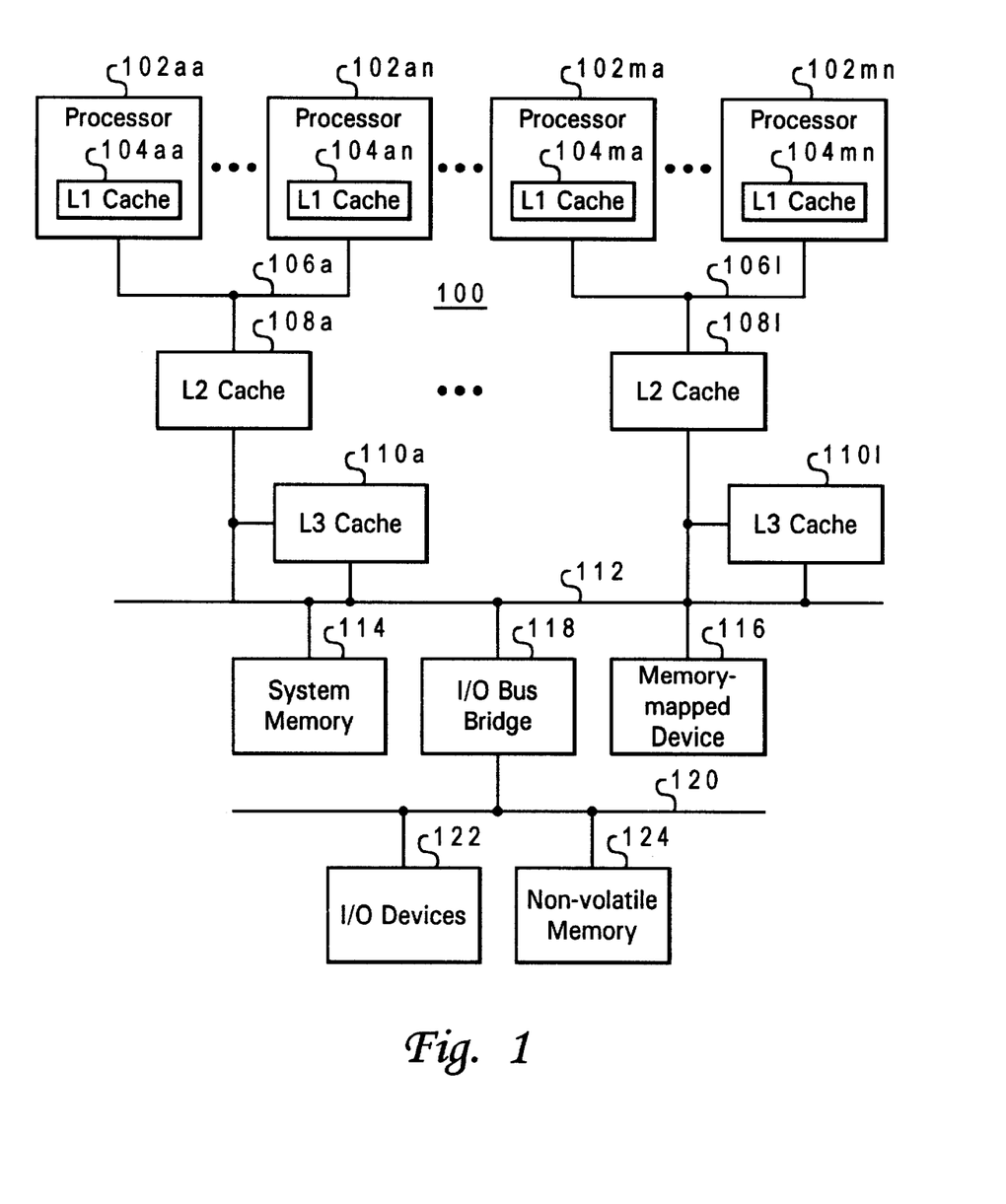
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric multiprocessor (SMP) system including a plurality of processors 102aa through 102an and 102ma through 102mn (where "m" and "in" are integers). Each processor 102aa–102mn includes a respective level one (L1) cache 104aa–104mn, preferably on chip with the processor and bifurcated into separate instruction and data caches. Each processor 102aa–102mn is coupled via a processor bus 106aa–106l to a level two cache 108a–108l (where "l" is an integer), which are in-line caches shared by multiple processors in the exemplary embodiment.

Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108a–108l is connected to a level three (L3) cache 110a–110l and to system bus 112. L3 caches 110a–110l are actually in-line caches rather than lookaside caches as FIG. 1 suggests, but operations received from a vertical L2 cache (e.g., L2 cache 108a) are initiated both within the L3 cache 110a and on system bus 112 concurrently to reduce latency. If the operation produces a cache hit within the L3 cache 110a, the operation is cancelled or aborted on system bus 112. On the other hand, if the operation produces a cache miss within the L3 cache 110a, the operation is allowed to proceed on system bus 112.

The lower cache levels—L2 caches 108a–108l and L3 caches 110a–110l—are employed to stage data to the L1 caches 104a–104l and typically have progressively larger storage capacities but longer access latencies. L2 caches 108a–108l and L3 caches 110a–110l thus serve as intermediate storage between processors 102a–102l and system memory 114, which typically has a much larger storage capacity but may have an access latency many times that of L3 caches 110a–110l. Both the number of levels in the cache hierarchy and the cache hierarchy configuration (i.e, shared versus private, in-line versus lookaside) employed in data processing system 100 may vary.

L2 caches 108a–108l and L3 caches 110a–110l are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Figure 2:
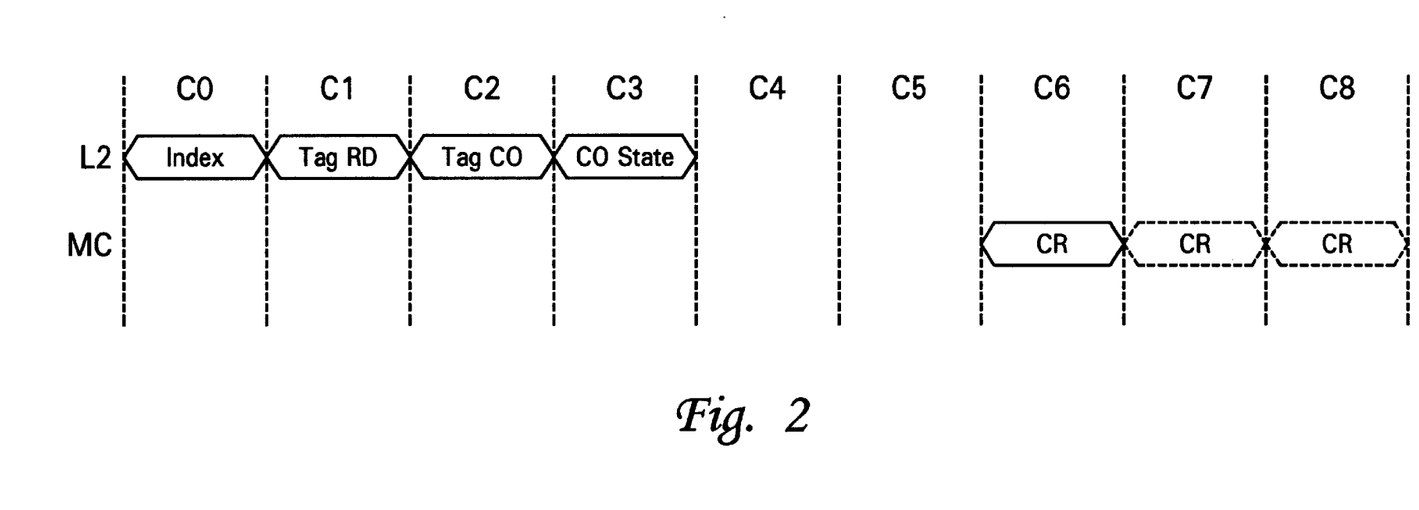
FIG. 2 is a timing diagram for a combined data access and related cast out operation in accordance with a preferred embodiment of the present invention.

Referring to FIG. 2, a timing diagram for a combined data access and related cast out operation in accordance with a preferred embodiment of the present invention is illustrated. In the exemplary embodiment, the combined operation is initiated on system bus 112 by an L2 cache 108a–108l in response to a cache miss for a data access operation within the L2 cache. However, the combined operation may be employed for transmission on any bus by any storage device requiring related data access and cast out operations. Similarly, the data access operation is a READ in the exemplary embodiment, but may be any data access operation (e.g., WRITE, etc.).

When a cache miss occurs within the L2 cache for a data access operation, the cache controller for the L2 cache should be able to determine from the coherency state of the selected victim whether a cast out operation will be required, either to preserve data within the cache location selected to be updated by the replacement policy or to update inclusivity information. Moreover, an indexed cache organization is employed for caches within the preferred embodiment. Cache lines are stored within the cache in congruence classes, sets of cache lines identified by a common index field within the system addresses for the cache lines in a congruence class.

Within an indexed cache organization, a portion of the system address for a cache line are treated as a tag, another portion of the system address is treated as the index, and the remaining bits are an intra-cache line address. The index field of the address is employed by the cache directory and the cache memory to locate congruence classes. The cache directory stores tags for cache lines contained within cache memory within the congruence class identified by the index, and compares the tag of a target address to the tags within the congruence class. If a match is identified, the corresponding cache line within cache memory is the target data.

In the prior art, the address for a data access operation and the address for a related cast out operation are transmitted in separate system bus operations. However, within an indexed cache organization of the type described, the target data of a data access operation and the victim selected by the replacement policy are members of the same congruence class. Therefore the index field will be identical for both the data access and the cast out operations. In the present invention, the index for the congruence class containing the target cache lines for both the data access and the cast out ("Index") is combined with the tags for the cache line targeted by the data access ("Tag RD") and the cache line targeted by the cast out or deallocate ("Tag CO").

The index and the two tags are then transmitted on the system bus in a single bus operation, which may require multiple bus cycles as shown. Fewer total bus cycles are required to transmit the combined index and tags, however, since the index need only be transmitted once. As illustrated in the example of FIG. 2, the directory state ("CO State") of the cast out victim cache line—i.e., coherency state and/or LRU position—may also be appended to the address in the combined or merged bus operation. The combined response—to both the data access and the cast out operations—is driven two cycles after transmission of the cast out victim state is complete and may require multiple cycles for reasons described in further detail below.

The combined operation of the present invention may be employed whenever the need to preserve some unique aspect of data arises, requiring a cast out operation for a related data access. Under the basic MESI coherency protocol, which includes the modified (M), exclusive (E), shared (S), and invalid (I) coherency states, a modified cache segment should be written to lower level storage when selected to be replaced. The modified state indicates that cache data has been modified with respect to corresponding data in system memory without also modifying the system memory data, such that the only valid copy of the data is within the cache entry storing the modified cache line or segment.

For exclusive, shared, or invalid cache segments, the cache segment selected for replacement need not be written to lower level storage since either (1) a valid copy already exists elsewhere in storage, or (2) the contents of the cache segment are invalid. The exclusive state indicates that the cache entry is consistent with system memory but is only found, within all caches at that level of the storage hierarchy, in the subject cache. The shared state indicates that the cache entry may be found in the subject cache as well as other caches at the same level in the storage hierarchy, with all copies of the data being consistent with the corresponding data in system memory. Finally, the invalid state indicates that a cache entry—both the data and the address tag—within a given cache entry is no longer coherent with either system memory or other caches in the storage hierarchy. However, in these instances a deallocate operation may be required as described below.

Coherency states implemented as extensions to the basic MESI protocol may also require a cast out, or elect to perform a cast out, and therefore benefit from the present invention. For example, the recent (R) state, essentially a variant of the shared state identifying a cache within a given storage level (e.g., L2 or L3) having shared intervention responsibility, indicates that the cache entry may be found in both the subject cache as well as other caches at the same level in the storage hierarchy, and that all copies of the data in the subject cache and other caches are consistent with the corresponding data in system memory, but also indicates that the subject cache, of all caches containing the shared data, most recently received the data in a system bus transaction such as a read from system memory and therefore has shared intervention responsibility. While a cast out is not necessary to preserve data integrity in such a case, a cast out operation may be useful to accurately maintain the recent state, and the combined address bus transaction of the present invention may be utilized for that purpose.

The combined operation of the present invention will save bus cycles over the dual operation scheme of the known art. If each index or tag requires a full bus cycle to completely transmit, the combined address of the present invention may be transmitted in three bus cycles (neglecting the optional state information), rather than four bus cycles as would be required for separate data access and cast out operations. The additional bus cycle is saved because the index field need only be transmitted once for both operations.

The resulting system bus transaction condenses, within a single address, the information required for both the data access operation and the related cast out. The combined index and tags may be transmitted in any predefined order, and may be transmitted on a single bus cycle or over multiple consecutive bus cycles as shown in FIG. 2. If the combined address is transmitted over multiple bus cycles, the index should be transmitted first to allow the receiving devices to begin a directory lookup at the earliest possible time. The tags may be transmitted during subsequent cycles and still be timely for the comparators employed to compared directory tags to the target tag(s). See commonly assigned, copending U.S. patent application Ser. No. 09/345, 302 entitled "INDEX BASED SYSTEM ADDRESS BUS," incorporated herein by reference.

Figure 3:
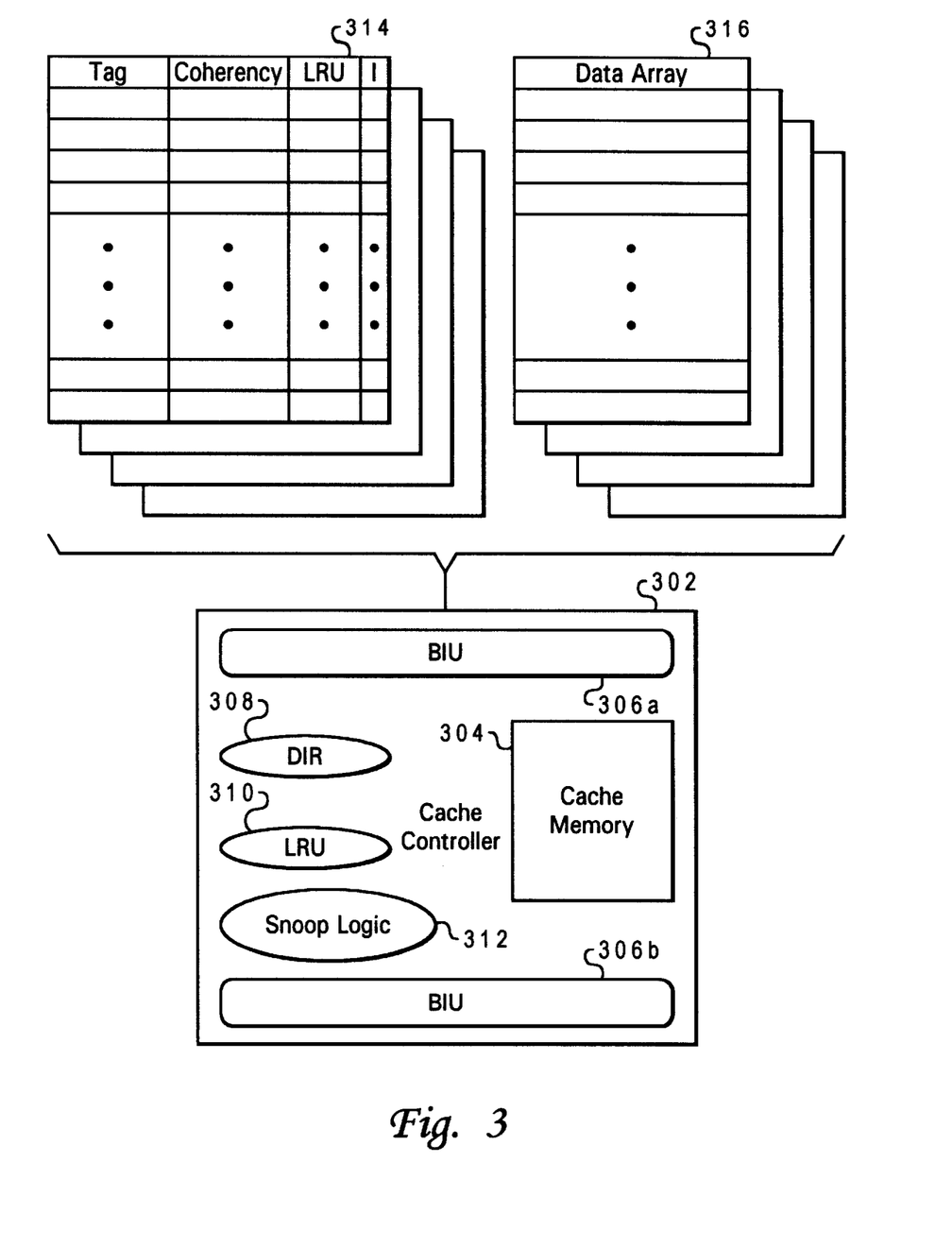
FIG. 3 depicts a diagram of a storage device which snoops or receives and responds to the combined operation for related data access and cast out operations in accordance with a preferred embodiment of the present invention.

With reference now to FIG. 3, a diagram of a storage device which snoops or receives and responds to the combined operation for related data access and cast out operations in accordance with a preferred embodiment of the present invention is depicted. The elements depicted are employed in L2 caches 108a–108l and in L3 caches 110a–110l. A cache controller 302 receives and transmits operations relating to data within cache memory 304 from upstream and downstream buses through bus interface units ("BIU") 306a and 306b. A directory lookup 308 is employed to locate cache lines within cache memory 304 and an LRU unit 310 implements the replacement policy for updating cache lines within cache memory 304. Snoop logic 312 detects operations initiated by a horizontal storage device (i.e., another L2 cache for L2 caches 108a–108l, and another L3 cache for L3 caches 110a–110l). Snoop logic 312 also controls the snoop response driven by the respective L2 cache in response to snooped operations.

The logical organization of data within the cache is in tables containing cache directory entries 314 and a corresponding data array 316. The cache directory entries 314 contain the address tag for the corresponding cache lines within data array 316, as well as the coherency state, the LRU status, and an inclusivity ("I") state for the respective cache line. The coherency state indicates the cache line consistency with other copies of the cache line in other storage devices within the system. The LRU status indicates the LRU position for the cache line within a congruence class. The inclusivity state indicates whether the cache line is stored within a logically in-line, higher level cache.

When a data access operation is received from a processor or higher level storage device, cache controller 302 may trigger the LRU 310 to select a victim, then look up the selected victim to determine if a cast out would be required to update the corresponding cache line and, if so, retrieve the tag for the current contents of the potential victim. This may be performed concurrently with the directory lookup and tag comparison employed to determine whether the received data access operation generates a cache hit or miss.

On the system bus side of the respective cache, when a combined operation for related data access and cast out operations is detected by cache controller 302 on a lower level bus coupling the cache and horizontal caches to lower levels of the storage hierarchy, snoop logic 312 may access cache directory entries 314 for both the data access target and the cast out victim to determine whether the target or victim are contained within data array 316 and, if so, to ascertain the coherency state and LRU position for the target and victim within the respective cache. Snoop logic 312 then drives a snoop response for the data access and cast out operations to the combined response logic, with the coherency state and the LRU position of a locally-stored cache line corresponding to the victim appended.

Where the combined operation is initiated by a higher level of the storage hierarchy (e.g., initiated by an L2 cache and received by an L3 cache), the cache controller 302 looks up the coherency state and LRU position of the cast out victim and drives a response to the combined operation with the coherency state and the LRU position of a locally-stored cache line corresponding to the victim appended.

Figure 4A:
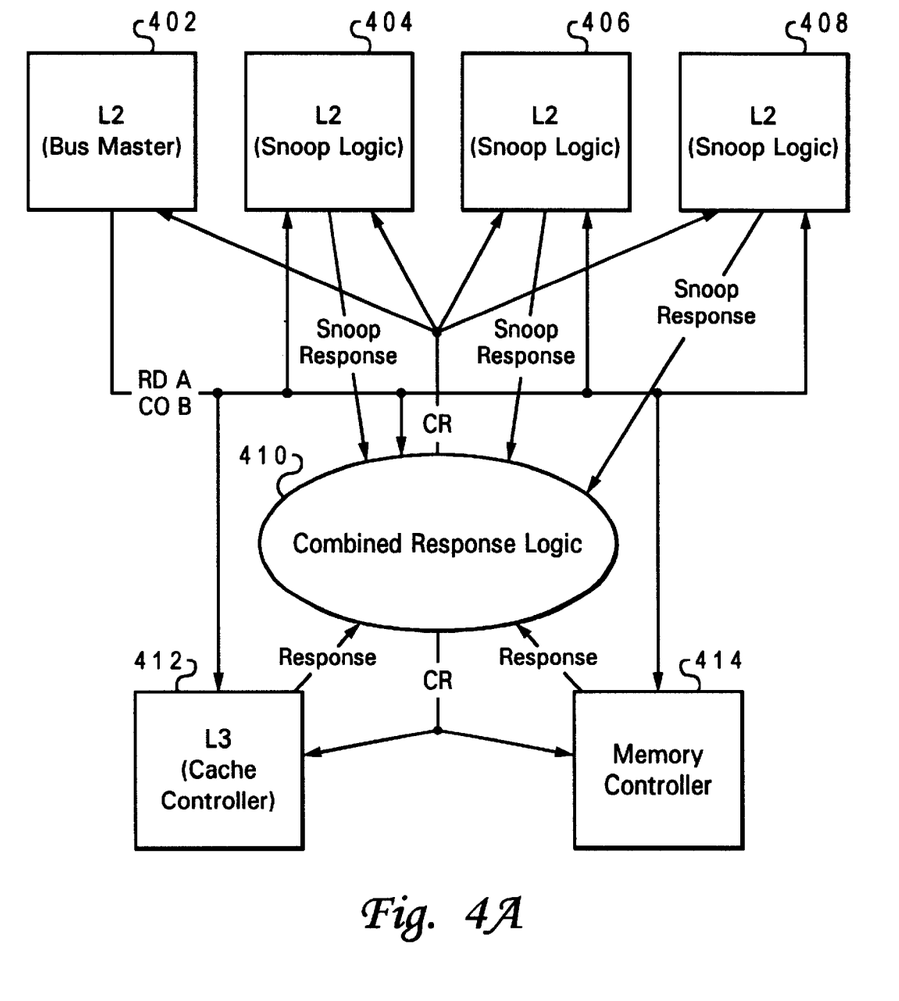
FIGS. 4A–4B are diagrams of a mechanism for cancelling a cast out operation or portion of an operation in accordance with a preferred embodiment of the present invention.
Figure 4B:
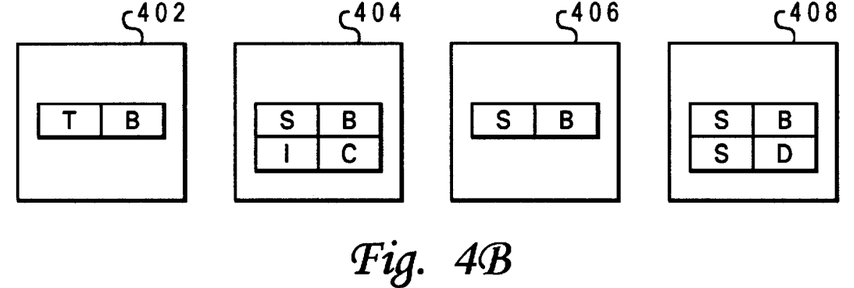

Referring to FIGS. 4A and 4B, diagrams of a mechanism for cancelling a cast out operation or portion of an operation in accordance with a preferred embodiment of the present invention is illustrated. The example selected for the purposes of describing the invention relates to L2 caches 108a–108l, L3 caches 110a–110l, system memory 114, and system bus 112 depicted in FIG. 1.

In the exemplary embodiment shown for the present invention, an L2 cache receives a data access operation from an in-line processor which misses. A cast out is required within L2 cache for replacement of an existing cache segment by the data access target. The bus interface logic 402 of the L2 cache therefore initiates (acting as a "bus master" after requesting and being granted the system bus) a combined data access and cast out operation of the type described above on the system bus. The combined data access and cast out operation requests a read of the cache line with the address A ("RD A") and a cast out of a cache line with the address B ("CO B").

The combined operation is detected by snoop logic 404, 406 and 408 within the remaining L2 caches coupled to the system bus, and is also received by combined response logic 410 (typically a part of the bus controller or the memory controller), by the cache controller 412 for a lower level L3 cache, and by the memory controller 414 for system memory.

Snoop logic 404, 406 and 408 and cache controller 412 checks the state of both the data access target and the cast out victim within the respective L2 or L3 cache. For both the data access target and the cast out victim, snoop logic 404, 406 and 408 and cache controller 412 each determine whether the subject cache line is contained within the respective L2 or L3 cache and, if so, what coherency state and LRU position are associated with the subject cache line in the respective L2 or L3 cache. Of particular interest are the coherency state and LRU position of the cast out victim. Snoop logic 404, 406 and 408 may also determine whether the respective L2 cache contains an invalid or shared entry within the congruence class for the cast out victim.

Based on the presence or absence of the subject cache line within a corresponding storage device and the coherency state of the subject cache line, snoop logic 404, 406 and 408 each select an appropriate response to the data access and cast out operations. The responses selected may include a null response to either the data access or the cast out, a retry for the data access or the cast out, or an intervention for the data access. Cache controller 412 and memory controller 414 also select appropriate responses to the data access and cast out portions of the combined operation, which may include a null response or a retry response to either the data access or the cast out.

The selected responses are "merged" by snoop logic 404, 406 and 408, cache controller 412, and memory controller 414 by selecting a single response code representing both selected responses to the data access and cast out operations. Snoop logic 404, 406 and 408 also appends the cache state for the cast out victim—i.e., the coherency state, the LRU position, or both—to the merged response. Cache controller 412 and memory controller 414 may also append coherency state or other information (i.e., nature of cache line as instructions or data) to the merged response.

It should be noted that the "merged response" is the joint response of a single storage device to two related (and, within the prior art, formerly discrete) data access and cast out operations, and differs from the "combined response" of all storage devices coupled to a bus on which the operations are initiated. Snoop logic 404, 406 and 408, cache controller 412, and memory controller 414 each then drive the merged response with any appended information to the combined response logic 410.

Combined response logic 410 receives the merged snoop responses of snoop logic 404, 406 and 408 and the merged responses of cache controller 412. and memory controller 414. Combined response logic 410 is responsible for utilizing these merged responses to formulate a combined response to be driven on system bus 112. Combined response logic 410 may optionally append the coherency state and LRU position of the victim within each snooper coupled to the system bus (i.e., the L2 caches corresponding to snoop logic 404, 406 and 408) to the combined response. The combined response is received by the bus master 402, snoop logic 404, 406 and 408, cache controller 412, and memory controller 414.

In formulating combined response to the combined data access and cast out operation, combined response logic 410 utilizes the coherency state and LRU position information of cache lines corresponding to victim B within the L2 caches, together with any information received from the L3 cache and system memory. Combined response logic 410 may also be configured with consideration of the "distances" (in latency) to and among various levels of the storage hierarchy. For example, the access latencies between storage devices within a given level of the storage hierarchy, or between clusters of storage devices at a given level in the storage hierarchy, may be significantly shorter than the access latencies to lower levels of the storage hierarchy or to system memory.

In the present invention, therefore, the combined response logic 410 may determine that the initiated cast out is less preferable than some alternative. The cast out portion of the combined operation thus becomes a "conditional" cast out, with the bus master 402 waiting for the combined response before sending or discarding the cast out data. The memory controller 414 will also wait for the combined response before looking for the cast out data.

The "conditional" cast out may also be a discrete operation from an unconditional cast out, and different combined data access and cast out opcodes may be employed to signal whether the cast out portion of the combined operation is conditional or unconditional. The bus master 402 initiating the combined operation may select the conditional version of the cast out or combined operation depending on, for example, a coherency state of the cast out victim (i.e., utilizing conditional cast outs only when the victim must be written to system memory).

In such conditional cast out operations, the combined response driven by combined response logic 410 is employed to instruct the bus master 402 whether to send the cast out data, to instruct snoopers whether to upgrade the coherency state and/or LRU position of a local cache line corresponding to the cast out victim, and to instruct the memory controller whether to expect the cast out data.

Different circumstances exists under which the combined response logic 410 might elect to effectively cancel the cast out portion of the combined operation. For example, lower levels of the storage hierarchy may respond to the combined operation with information that the target of the data access is read once data. In this case, casting out a cache line to make room for a cache line which will only be accessed once is an inefficient use of available storage.

As another example, the data access target may be available from a lower level cache (e.g., an in-line L3) or from a different cluster of caches at the same level (e.g., an L2 cache within a different cluster—sharing a different L2 cache—than the bus master 402). The increased access latency associated with retrieving the requested data from an lower level cache or with an intervention required to source the data from another cache at the same level will usually be less that the latency required to cast out a cache line which must be written all the way to system memory. The latency to system memory may be orders of magnitude greater than the latency to the next lower cache level.

As still another example, a horizontal or vertically in-line storage device may indicate within the response or snoop response to the combined operation that it has space available (i.e., and invalid or shared cache line) within the congruence class for the cast out victim. Thus, the amount of useful data accessible to the bus master 402 may be maximized, with acceptable increase in overall latency, by replacing an invalid or shared cache line in another storage device rather than replacing a modified, tagged, or similar cache line in the L2 cache corresponding to bus master 402.

Accordingly, combined response logic 410 may elect to cancel a cast out when the selected victim is in the tagged (T) coherency state, a variant of the modified coherency state identifying a cache having write back responsibility within a given storage hierarchy level, or within a given cluster of caches at the same storage hierarchy level. The latency associated with writing the cast out data all the way to system memory may be avoided or deferred by some alternative measure.

The combined response logic 410 may select one of several alternatives to the cast out portion of the combined operation. For vertical, non-inclusive cache, the combined response may direct that the cast out victim merely be written to the next lower cache level. For example, if an L2 cache selected a shared cache line to cast out, and an in-line but non-inclusive L3 cache reported (in its response) a cache miss for the cast out victim, the combined response may direct that the cast out victim be written to the L3 rather than written all the way back to system memory.

Another alternative is for the combined response to instruct the bus master 402 not to deallocate the cast out victim and to NOT allocate storage space for the data access target. The L2 cache corresponding to the bus master 402 would still pass the data access target to the processor core initiating a data access within missed within that L2 cache, but would not save a copy of the data access target in the data storage for that L2 cache. This alternative is best suited for circumstances in which the lower levels of the storage hierarchy provide information regarding read-once data.

Yet another alternative in cancelling a cast out operation or cast out portion of a combined operation is for the combined response to instruct the L2 cache corresponding to bus master 402 not to deallocate the victim cache line, and instructs a snooper to allocate and save the data access target. This is advantageous in circumstances such as those depicted in FIG. 4B. The cast out target B is in a coherency state (T) requiring that the data be written all the way to memory. However, other caches at the same storage hierarchy level contain cache lines (having addresses "C" and "D") within the congruence class for the victim which are in the invalid or shared coherency state. Overall storage efficiency may thus be improved, with acceptable impact on access latencies, by replacing one of the shared or invalid cache lines with the data access target, and not deallocating the cast out victim in the L2 cache corresponding to bus master 402.

It should be noted that the cancellation of the cast out operation in the present invention terminates any effort to perform the cast out, typically directing that a substitute operation be performed in lieu of the cast out. This differ from prior art responses to a cast out operation such as a retry response, which merely defer or delay performance of the cast out.

With reference now to FIGS. 5A through 5D, high level flow charts for processes of cancelling and handling cancellation of a cast out operation or cast out portion of an operation in accordance with a preferred embodiment of the present invention are depicted. The processes are performed within combined response logic 410, a bus master 402, snoopers 404, 406 or 408, and a memory controller 414 such as those shown in FIG. 4, or similar devices.

Figure 5A:
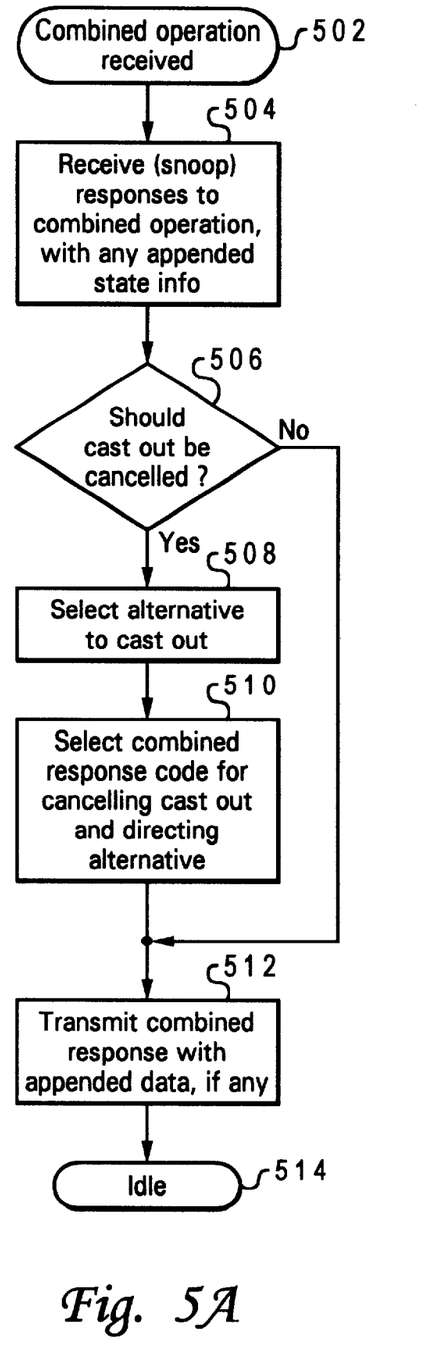
FIGS. 5A–5D are high level flow charts for processes of cancelling and handling cancellation of a cast out operation or portion of an operation in accordance with a preferred embodiment of the present invention.

FIG. 5A depicts the process of cancelling a cast out portion of an operation within the combined response logic. The process begins at step 502, which depicts a combined data access and cast out operation (in this example) being received from the storage device initiating the combined operation. The process next passes to step 504, which illustrates receiving snoop responses from storage devices at the same storage hierarchy level as the storage device initiating the combined operation, as well as responses from lower level storage devices (e.g., lower level caches or a memory controller). Appended to the responses are state information—coherency state, LRU position, or both—regarding the cast out victim within a respective storage device, and any other useful information such as whether a horizontal storage device contains an invalid or shared entry in the congruence class for the cast out victim, whether the data access target is likely to only be accessed once, and the like.

The process passes next to step 506, which depicts a determination of whether the cast out should be cancelled. This determination is made based on the need to access the target data more than once, the availability of space within horizontal storage or lower levels of storage before the system memory, and the latency required to access data from system memory. Based on these factors, if the cast out should be cancelled, the process proceeds to step 508, which illustrates selecting an alternative to the cast out operation. The alternative may be to forward the data to the processor without allocating storage space for it, to write the cast out data to a lower storage level or to a horizontal storage device, or to store the target data within a horizontal storage device.

The process next passes to step 510, which depicts selecting a combined response code for cancelling the cast out and directing that the selected alternative be performed, and then to step 512, which illustrates transmitting the combined response code. The process then passes to step 514, which depicts the process becoming idle until another operation involving a cast out is received.

Figure 5B:
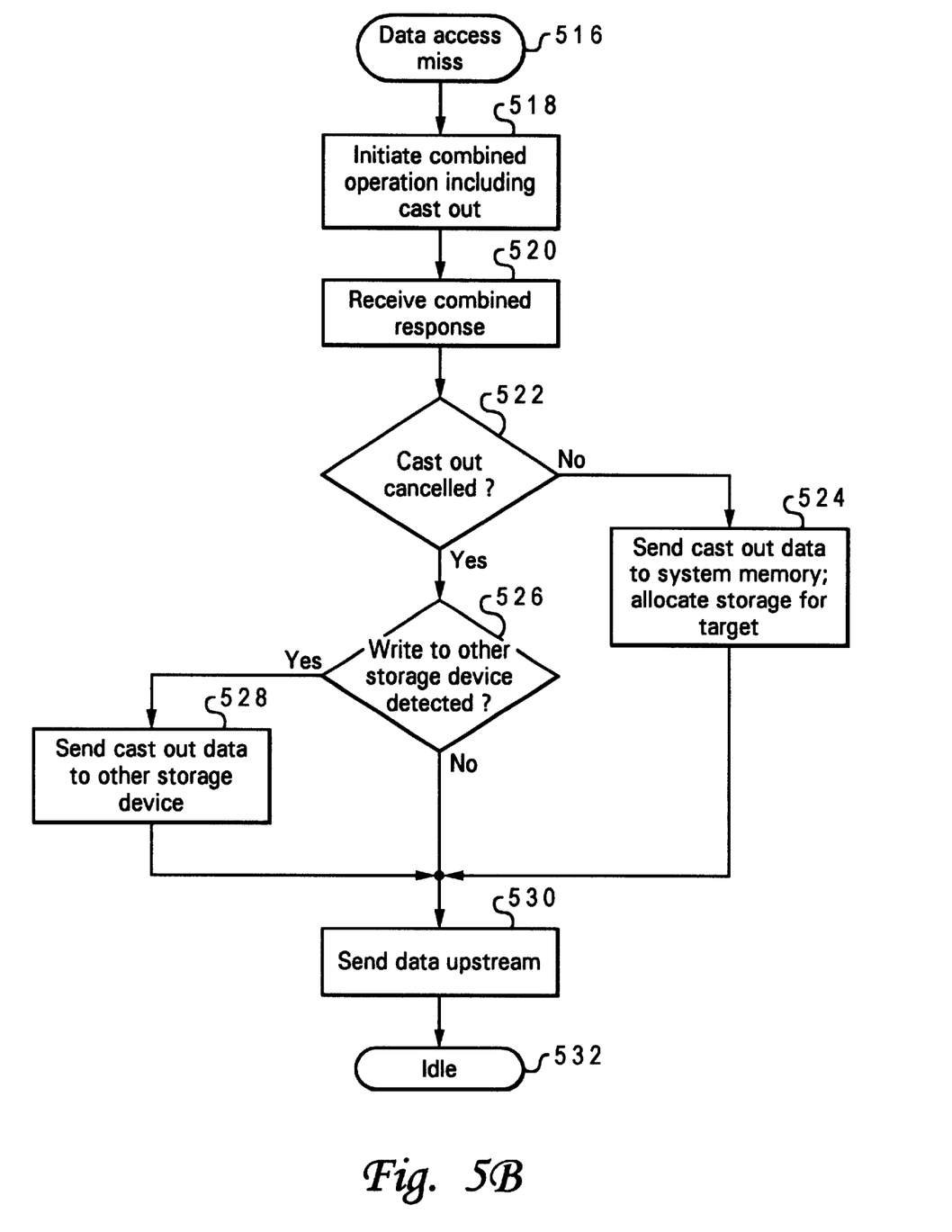

FIG. 5B depicts a process of handling cancellation of a cast out portion of an operation within a bus master. The process begins at step 516, which depicts a data access initiated by a higher level device missing within the subject storage device, necessitating a cast out. The process then passes to step 518, which illustrates transmission of a combined operation including the cast out of a selected victim.

The process next passes to step 518, which depicts initiating a combined operation including a cast out, appending the coherency state of the cast out victim to the combined operation, and then to step 520, which illustrates receiving a combined response to the combined operation. The process passes next to step 522, which depicts a determination of whether the cast out portion of the combined operation was cancelled by the combined response. If not the process proceeds to step 524, which illustrates sending the cast out data to system memory and allocating the storage formerly occupied by the victim for the data access target.

If the cast out portion of the combined operation is cancelled by the combined response, the process proceeds instead to step 526, which depicts a determination of whether the combined response includes a direction to write the cast out victim data to another, lower level storage device. If so, the process proceeds to step 528, which illustrates sending the cast out data to the other storage device.

From either of steps 524 or 528, and from step 526 if the combined response does not direct that the cast out data be written to another storage device, the process passes to step 530, which depicts sending the data access target upstream to the device initiating the combined operation. The process then passes to step 532, which illustrates the process becoming idle until another data access misses.

Figure 5C:
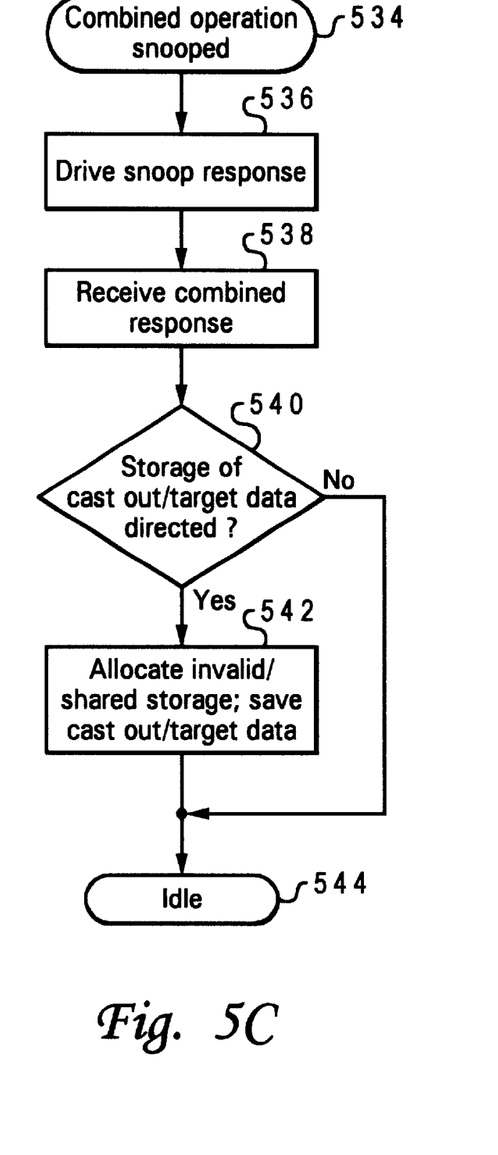

FIG. 5C depicts a process of handling cancellation of a cast out portion of an operation within a snooper. The process begins with step 534, which depicts snooping a combined operation, and then passes to step 536, which illustrates driving a snoop response to the combined operation with the coherency state and LRU position of the victim appended, together with a signal indicating whether the snooper contains any shared or invalid entries within the congruence class for the victim.

The process next passes to step 538, which depicts receiving the combined response, and then to step 540, which illustrates a determination of whether the combined response directs the snooper to store the cast out or target data. If so, the process proceeds to step 542, which depicts allocating a storage location containing data in a shared or, preferably, invalid coherency state and saving the cast out or target data in that location. If not, and after saving the cast out or target data, the process proceeds to step 544, which illustrates the process becoming idle until anther combined operation is snooped.

Figure 5D:
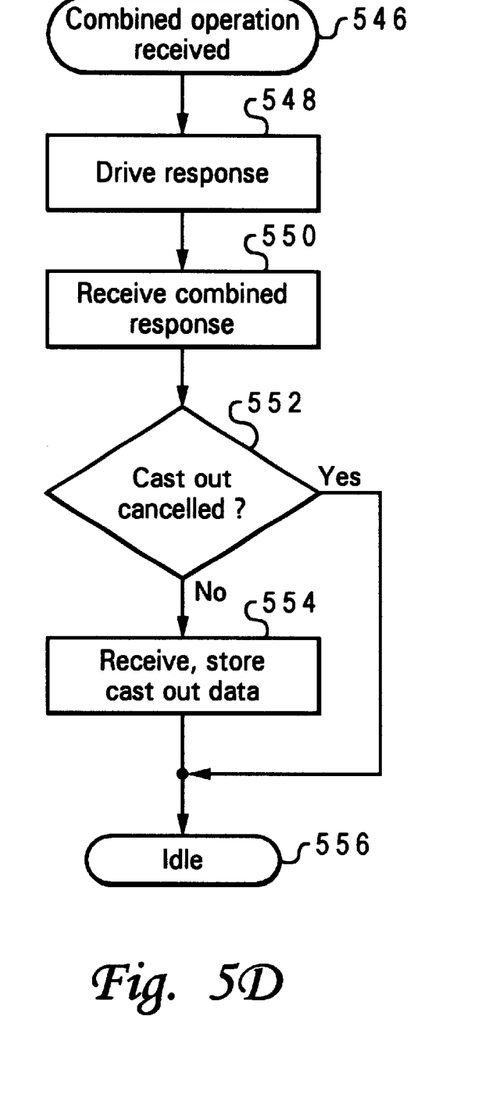

FIG. 5D depicts a process of handling cancellation of a cast out portion of an operation within a memory controller. The process begins with step 546, which depicts receiving a combined operation, and then passes to step 548, which illustrates driving a response to the combined operation with the any information regarding the cast out victim or data access target (e.g., read-once data, etc.) appended.

The process next passes to step 550, which depicts receiving the combined response, and then to step 552, which illustrates a determination of whether the combined response cancels the cast out. If not, the process proceeds to step 554, which depicts receiving and storing the cast out data. If so, or after saving the cast out data, the process proceeds to step 556, which illustrates the process becoming idle until anther combined operation is received.

While the invention has been particularly shown and described with reference to a preferred embodiment, it will be understood by those skilled in the art that various changes in form and detail may be made therein without departing from the spirit and scope of the invention.

What is claimed is:

1. A method of managing data storage, comprising:
cancelling a cast out of a victim; and
directing a storage device initiating an operation including the cast out not to allocate storage for a target of a data access related to the cast out.

2. The method of claim 1, wherein the step of cancelling a cast out of a victim further comprises:
transmitting a combined response to the operation including the cast out, wherein the combined response transmitted cancels the cast out.

3. The method of claim 2, wherein the step of transmitting a combined response to the operation including the cast out further comprises:
transmitting a combined response to a combined operation including the cast out and the data access.

4. The method of claim 1, wherein the step of directing a storage device initiating an operation including the cast out not to allocate storage for a target of a data access related to the cast out further comprises:
transmitting a combined response to the operation including the cast out, wherein the combined response transmitted directs the storage device not to allocate storage for the target.

5. The method of claim 4, wherein the step of transmitting a combined response to the operation including the cast out further comprises:

transmitting a combined response to a combined operation including the cast out and the data access.

6. The method of claim 4, further comprising:

directing the storage device to pass the target to a higher level storage device.

7. The method of claim 4, further comprising:

directing a horizontal storage device to store the target.

8. The method of claim 4, further comprising:

directing a lower level storage device to store the target.

9. The method of claim 1, further comprising:

determining whether the cast out should be cancelled.

10. The method of claim 9, wherein the step of determining whether the cast out should be cancelled further comprises:

determining that the target of the data access is a read-once data element.

11. The method of claim 9, wherein the step of determining whether the cast out should be cancelled further comprises:

determining that a victim of the cast out must be written to system memory; and determining that storage is available in a horizontal storage device.

12. The method of claim 9, wherein the step of determining whether the cast out should be cancelled further comprises:

determining that a victim of the cast out must be written to system memory; and determining that storage is available in a lower level storage device above the system memory.

13. A system for managing data storage, comprising:

a storage device containing a victim of a cast out; and combined response logic responding to an operation including the cast out, cancelling the cast out of the victim, and directing the storage device not to allocate storage for a target of a data access related to the cast out.

14. The system of claim 13, wherein the combined response logic transmits a combined response to the operation including the cast out, wherein the combined response transmitted cancels the cast out.

15. The system of claim 13, wherein the combined response logic transmits a combined response to a combined operation including the cast out and the data access.

16. The system of claim 13, wherein the combined response logic transmits a combined response to the operation including the cast out, wherein the combined response transmitted directs the storage device not to allocate storage for the target.

17. The system of claim 16, wherein the combined response logic transmits a combined response to a combined operation including the cast out and the data access.

18. The system of claim 16, wherein the combined response logic directs the storage device to pass the target to a higher level storage device.

19. The system of claim 16, wherein the combined response logic directs a horizontal storage device to store the target.

20. The system of claim 16, wherein the combined response logic directs a lower level storage device to store the target.

21. The system of claim 13, wherein the combined response logic determines whether the cast out should be cancelled.

22. The system of claim 21, wherein the combined response logic determines that the cast out should be cancelled by determining that the target of the data access is a read-once data element.

23. The system of claim 21, wherein the combined response logic determines that the cast out should be cancelled by determining that a victim of the cast out must be written to system memory and determining that the storage is available in a horizontal storage device.

24. The system of claim 21, wherein the combined response logic determines that the cast out should be cancelled by determining that a victim of the cast out must be written to system memory and determining that the storage is available in a lower level storage device above the system memory.

* * * * *

UNITED STATES PATENT AND TRADEMARK OFFICE
CERTIFICATE OF CORRECTION

PATENT NO.    : 6,321,305 B1
DATED         : November 20, 2001
INVENTOR(S)   : Arimilli et al.

It is certified that error appears in the above-identified patent and that said Letters Patent is hereby corrected as shown below:

Column 10,
Line 23, delete the words "within missed within that L2 cache".

Column 12,
Line 26, delete the words "the any information" and replace them with the words -- any information --.

Signed and Sealed this

Seventh Day of May, 2002

Attest:

JAMES E. ROGAN
Attesting Officer   Director of the United States Patent and Trademark Office